US006451903B1

(12) United States Patent
Asano et al.

(10) Patent No.: US 6,451,903 B1
(45) Date of Patent: *Sep. 17, 2002

(54) FILLED PARTICULATE POWDER OF POLYTETRAFLUOROETHYLENE AND PROCESS FOR PREPARING THE SAME

(75) Inventors: Michio Asano; Masamichi Sukegawa, both of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/381,130

(22) PCT Filed: Mar. 11, 1998

(86) PCT No.: PCT/JP98/01037

§ 371 (c)(1),
(2), (4) Date: Sep. 16, 1999

(87) PCT Pub. No.: WO98/41569

PCT Pub. Date: Sep. 24, 1998

(30) Foreign Application Priority Data

Mar. 17, 1997 (JP) .............................. 9-084488

(51) Int. Cl.$^7$ .............................................. C08L 27/12
(52) U.S. Cl. ...................................................... 524/546
(58) Field of Search .......................................... 524/546

(56) References Cited

U.S. PATENT DOCUMENTS

| 3,674,736 A | 7/1972 | Lerman et al. | ............ 260/41 R |
|---|---|---|---|
| 3,766,133 A | 10/1973 | Roberts et al. | ............ 260/41 R |
| 3,915,916 A | 10/1975 | Leverett | ................ 260/29.6 F |
| 4,370,436 A | 1/1983 | Nakamura et al. | ........... 524/322 |
| 4,440,879 A * | 4/1984 | Kawachi | ....................... 523/200 |
| 5,189,143 A * | 2/1993 | Honda | ........................ 528/498 |
| 5,321,059 A * | 6/1994 | Honda | ........................ 523/212 |
| 6,037,402 A * | 3/2000 | Asano | ......................... 525/545 |

FOREIGN PATENT DOCUMENTS

| JP | 56-115326 | 9/1981 |
|---|---|---|
| JP | 3-255133 | 11/1991 |
| JP | 3-259926 | 11/1991 |
| JP | 4-13729 | 1/1992 |
| JP | 5-112690 | 5/1993 |
| JP | WO 93/16126 | 8/1993 |
| JP | 7-252365 | 10/1995 |

OTHER PUBLICATIONS

European Search Report dated Aug. 8,2000.

* cited by examiner

*Primary Examiner*—Paul R. Michl
(74) *Attorney, Agent, or Firm*—Armstrong, Westerman, & Hattori, LLP (57) ABSTRACT

Filler-containing polytetrafluoroethylene granular powder, which has a large apparent density, a small average particle size, a narrow particle size distribution, a superior powder flowability, a small electrostatic charge and gives a molded product having a superior tensile strength and elongation a high degree of whiteness and a low surface roughness, and a process for preparing the same. The granulation is carried out by stirring, in water, of a PTFE powder and a filler in the presence of an organic liquid forming liquid-liquid interface with water and an anionic surfactant and/or nonionic surfactant such as a segmented polyalkylene glycol having a hydrophobic segment and hydrophilic segment and deagglomerating of the powder.

19 Claims, 8 Drawing Sheets

FILLED PARTICULATE POWDER OF POLYTETRAFLUOROETHYLENE AND PROCESS FOR PREPARING THE SAME

TECHNICAL FIELD

The present invention relates to a filler-containing polytetrafluoroethylene granular powder and a preparation process thereof.

BACKGROUND ART

Hitherto, a process for preparing a filler-containing polytetrafluoroethylene (PTFE) granular powder by granulating a mixture of a filler and a PTFE powder with stirring in water was proposed, for example, in JP-B-43-8611, JP-B-44-22619, JP-B-48-37576, JP-B-49-17855, JP-B-56-8044, JP-B-57-18730, etc.

However, by the process for preparation disclosed in each of the above-mentioned patent publications, a filler-containing PTFE granular powder having a small particle size and a narrow particle size distribution could not be obtained.

For that reason, in case of preparing, for example, small articles such as seal rings in the form of a rubber band, thin moldings and molded products having a small surface roughness, there was a problem that complicated and uneconomical steps must be employed, such as step of sieving a filler-containing PTFE granular powder to take out only particles of small size and molding them, or step of cutting the obtained molding.

Also a granular powder having excellent powder flowability cannot be obtained by only pulverizing a filler-containing PTFE granular powder.

In JP-B-60-21694, there was proposed a process for preparing a filler-containing PTFE granular powder by granulating, with stirring in water, a PTFE powder and a filler which has been previously surface-treated with an aminosilane compound in coexistence with a water-insoluble organic liquid and an anionic surfactant. However, an apparent density of the filler-containing PTFE granular powder and tensile strength of molded products obtained therefrom are not fully satisfactory.

The present inventors have made intensive studies in view of the above-mentioned problems, and as a result, have found that those problems can be solved by granulating a mixture of a PTFE powder and a filler with stirring in water in the presence of an organic liquid which forms liquid-liquid interface with water and a specific nonionic and/or anionic surfactant.

An object of the present invention is to provide a filler-containing PTFE granular powder having a good processability and a process for preparation thereof. Particularly an object of the present invention is to provide a filler-containing PTFE granular powder which has a large apparent density, a small average particle size, a narrow particle size distribution, a small electrostatic charge and good physical properties such as powder flowability, and gives molded products having excellent physical properties such as elongation and surface smoothness and a high whiteness, and a process for preparation thereof.

DISCLOSURE OF THE INVENTION

The present invention relates to a process for preparing a filler-containing polytetrafluoroethylene (PTFE) granular powder by granulation of a mixture of a polytetrafluoroethylene (PTFE) powder and a filler in water with stirring; characterized in that the granulation is carried out by stirring the mixture in water in the presence of an organic liquid which forms liquid-liquid interface with water and an anionic surfactant and/or nonionic surfactant having a hydrophobic segment comprising a poly(oxyalkylene) unit having 3 or 4 carbon atoms and a hydrophilic segment comprising a poly(oxyethylene) unit.

The above-mentioned process can give a filler-containing PTFE granular powder having an apparent density of not less than 0.7 g/cm$^3$ and an electrostatic charge of not more than 50 V.

The present invention also relates to a filler-containing PTFE granular powder which is characterized in that in case of an apparent density of not less than 0.7 g/cm$^3$ and less than 0.9 g/cm$^3$, an angle of repose is not more than 40 degrees and an electrostatic charge is not more than 10 V; in case of an apparent density of not less than 0.9 g/cm$^3$ and less than 1.0 g/cm$^3$, an angle of repose is not more than 38 degrees and an electrostatic charge is not more than 10 V; and in case of an apparent density of not less than 1.0 g/cm$^3$, an angle of repose is not more than 36 degrees and an electrostatic charge is not more than 10 V and an average particle size is not more than 500 μm.

BEST MODE FOR CARRYING OUT THE INVENTION

The PTFE powder used in the present invention is prepared by usual suspension polymerization, and preferable is, for example, a powder comprising homopolymer of tetrafluoroethylene (TFE) or a copolymer of TFE and a monomer copolymerizable with TFE. An average particle size after the pulverization is not larger than 200 μm, preferably not larger than 50 μm, and a lower limit thereof is defined by a pulverizing apparatus and pulverizing technique.

As the monomer copolymerizable with TFE, there are, for example, a perfluoro(vinyl ether) represented by the formula (I):

(I)

wherein $R_f$ is a perfluoroalkyl group having 1 to 10 carbon atoms, a perfluoro(alkoxyalkyl) group having 4 to 9 carbon atoms, an organic group represented by the formula (II):

(II)

in which m is 0 or an integer of 1 to 4, or an organic group represented by the formula (III):

(III)

in which n is an integer of 1 to 4, and the like.

The number of carbon atoms of the above-mentioned perfluoroalkyl group is from 1 to 10, preferably from 1 to 5.

When the number of carbon atoms is within the above-mentioned range, an effect of making creep resistance excellent can be obtained with maintaining the property of being not-melt-processable.

As the above-mentioned perfluoroalkyl group, there are, for example, perfluoromethyl, perfluoroethyl, perfluoropropyl, perfluorobutyl, perfluoropentyl, perfluorohexyl and the like. From the viewpoint of creep resistance and cost of monomer, perfluoropropyl is preferable.

When a proportion of the monomer copolymerizable with TFE is within the range of 1.0 to 0.001% by mole, an effect of making creep resistance excellent can be obtained.

In the present invention, there are used particles obtained by pulverizing the above-mentioned PTFE powder to an average particle size of not more than 200 μm, preferably not more than 50 μm, for example, in the presence of water or under dry condition by means of a pulverizing machine such as hammer mill, crusher equipped with a rotor having blades, jet mill and impact mill.

The use of the above-mentioned particles having the average particle size in the above-mentioned range gives such effects that the granular powder obtained through granulation is easily handled, that is, having good powder flowability and an excellent apparent density, and in addition, the obtained molded articles have good physical properties.

In the present invention, in case where a hydrophilic filler is used, there is a drawback such that the filler is easily transferred into a liquid phase due to its hydrophilic property and is difficult to be mixed with the PTFE powder homogeneously, that is, the agglomerated powder in which the whole of the filler used is mixed with the PTFE powder cannot be obtained and a part of the filler remains in the treating water. This phenomenon is so-called the separation of filler.

To cope with that problem, there is employed a method of previously surface-treating a hydrophilic filler for making it hydrophobic to lower its surface activity near the surface activity of the PTFE powder and stirring in water, a method of adding a compound having such a function in an aqueous medium and then stirring or the like method.

As the compound known as one used for the above-mentioned surface treatment, there are (a) a functional amino-containing silane, a phenyl-containing silane, and/or a soluble silicone (JP-A-51-548, JP-A-51-549, JP-A-4-218534), (b) a monocarboxylic acid of hydrocarbon having 12 to 20 carbon atoms (JP-B-48-37576), (c) a chromium complex compound of an aliphatic carboxylic acid (JP-B-48-37576), (d) a silicone (JP-A-53-139660), etc. and (e) a method of coating a hydrophilic filler with PTFE (JP-A-51-121417) is also known.

A filler having water-repelling property can be used as it is.

Examples of the above-mentioned filler are, for instance, one or more of glass fiber, graphite powder, metal fibers or metal powders such as bronze powder, gold powder, silver powder, copper powder, stainless steel powder, stainless steel fiber, nickel powder and nickel fiber; inorganic fibers or inorganic powders such as molybdenum disulfide powder, fluorinated mica powder, coke powder, carbon fiber, boron nitride powder and carbon black; organic powders such as heat-resistive aromatic resin powder, e.g. polyoxybenzoyl polyester, polyimide powder, tetrafluoroethylene-perfluoro (alkyl vinyl ether) copolymer (PFA) powder and polyphenylene sulfide powder; and the like. The filler is not limited thereto.

In case where two or more fillers are used, preferable combination is, for example, glass fiber and graphite powder, glass fiber and molybdenum disulfide powder, bronze powder and molybdenum disulfide powder, bronze powder and carbon fiber, graphite powder and coke powder, graphite powder and heat-resistive aromatic resin powder, carbon fiber and heat- resistive aromatic resin powder or the like. The mixing method may be either of wet method or dry method.

The filler-containing PTFE granular powder of the present invention has a PTFE portion having high whiteness, and therefore when a white or transparent filler, for example, glass fiber, boron nitride powder, titanium oxide powder or the like is used, molded articles having higher whiteness (Z value) as compared with conventional molded articles can be obtained.

It is preferable that an average particle size of the above-mentioned filler is from 10 to 1,000 μm in case of a powder and an average fiber length is from 10 to 1,000 μm in case of a fiber.

Examples of the above-mentioned compound used for the surface treatment of the hydrophilic filler are, for instance, aminosilane coupling agents such as γ-aminopropyltriethoxysilane($H_2N(CH_2)_3Si(OC_2H_5)_3$), m- or p-aminophenyltriethoxysilane($H_2N-C_6H_4-Si(OC_2H_5)_3$), γ-ureidopropyltriethoxysilane ($H_2NCONH(CH_2)_3Si(OC_2H_5)_3$), N-(β-aminoethyl)-γ-aminopropyltrimethoxysilane ($H_2N(CH_2)_2NH(CH_2)_3Si(OCH_3)_3$) and N-(β-aminoethyl)-γ-aminopropylmethyldimethoxysilane ($H_2N(CH_2)_2NH(CH_2)_3SiCH_3(OCH_3)_2$), and the like. In addition to those compounds, there are, for example, organosilane compounds such as phenyltrimethoxysilane, phenyltriethoxysilane, p-chlorophenyltrimethoxysilane, p-bromomethylphenyltrimethoxysilane, diphenyldimethoxysilane, diphenyldiethoxysilane and diphenylsilanediol.

In order to obtain the mixture of the PTFE powder and the filler which is used in the present invention, for example, the filler may be mixed uniformly with the PTFE powder containing particles of not more than 200 μm by means of a pulverizing mixer, flush mixer, blender, kneader or the like. It is preferable that the proportion of the filler is form 2.5 to 100 parts (parts by weight, hereinafter the same) on the basis of 100 parts of the PTFE powder.

The organic liquid forming liquid-liquid interface with water, which is used in the present invention, may be an organic liquid capable of forming a liquid-liquid interface with water and being present as droplets in water or may be one which dissolves somewhat in water as far as it is capable of forming droplets in water and a liquid-liquid interface with water. Examples thereof are, for instance, alcohols such as 1-butanol and 1-pentanol; ethers such as diethyl ether and dipropyl ether; ketones such as methyl ethyl ketone and 2-pentanone; aliphatic hydrocarbons such as pentane and dodecane; aromatic hydrocarbons such as benzene, toluene and xylene; halogenated hydrocarbons such as methylene chloride, tetrachloroethylene, trichloroethylene, chloroform, chlorobenzene, trichlorotrifluoroethane, monofluorotrichloromethane, difluorotetrachloroethane, 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane; and the like. Among them, the halogenated hydrocarbons are preferable, and particularly preferable are chlorinated- and fluorochlorinated-hydrocarbons such as 1,1,1-trichloroethane, 1,1-dichloro-2,2,3,3,3-pentafluoropropane, 1,3-dichloro- 1,1,2,2,3-pentafluoropropane, 1,1-dichloro-2,2,2-trifluoroethane and 1,1-dichloro- 1-fluoroethane. Those are nonflammable and satisfy requirements for fleon restrictions. Those organic liquids may be used solely or in combination use of two or more thereof.

An amount of the above-mentioned liquid-liquid interface-forming organic liquid is from 30 to 80% (% by weight, hereinafter the same), preferably from 40 to 60% on the basis of the total amount of the PTFE powder and filler.

In the present invention, as mentioned above, it appears that the granulation of the filler-containing PTFE powder is conducted in the droplets of the above-mentioned liquid-liquid interface-forming organic liquid and that, since the droplets of the liquid become smaller and more approximate to a spherical form because of functioning of a specific nonionic surfactant or anionic surfactant, particles having a smaller size and a form near sphere can be obtained, and an apparent density of the granular powder is increased.

The specific nonionic surfactants are segmented polyalkylene glycols having a hydrophobic segment comprising poly(oxyalkylene) unit having 3 or 4 carbon atoms and a hydrophilic segment comprising poly(oxyethylene) unit.

As the segmented polyalkylene glycols having a hydrophobic segment and hydrophilic segment, preferable are, for example, those represented by the formula (IV):

$$H—(OCH_2CH_2)_q—(A)_p—(CH_2CH_2O)_q—H \quad (IV)$$

wherein A is p is an integer of 5 to 200, q is an integer of 2 to 400. From the viewpoint of being easily adsorbed in the PTFE resin, it is preferable that p is from 15 to 40 and q is from 7 to 100. As the commercially available nonionic surfactants, there can be used, for example, Puronon #208, Puronon #104 (both are nonionic surfactants available from Nippon Yushi Kabushiki Kaisha) and the like.

An amount of the above-mentioned nonionic surfactant is from 0.01 to 5%, preferably from 0.1 to 0.3% on the basis of the PTFE powder.

By using the nonionic surfactant in the above-mentioned range, there can be obtained a granular powder being nearly in the spherical form and having a small particle size, a narrow particle size distribution, an excellent powder flowability and a large apparent density.

In the present invention, as the surfactant, the anionic surfactant may be used alone or in combination use of the nonionic surfactant. When the anionic surfactant is used alone, its amount may be from 0.01 to 5% on the basis of the PTFE powder. In case of the combination use of the anionic surfactant with the nonionic surfactant, the respective amounts thereof may be from 0.001 to 5% on the basis of the PTFE powder.

Examples of the above-mentioned anionic surfactant are known ones, for example, higher fatty acid and its salt, alkyl sulfate, alkyl sulfonate, alkyl aryl sulfonate, alkyl phosphoric acid ester and the like. Particularly preferable anionic surfactant is a sulfate of higher alkyl alcohol, for example, sodium lauryl sulfate or a fluorine-containing sulfonic acid type-or carboxylic acid type-anionic surfactant having a fluoroalkyl group or chlorofluoroalkyl group. The typical compounds thereof are those represented by the formula (V):

or the formula (VI):

wherein X is hydrogen atom, fluorine atom or chlorine atom, n is an integer of 3 to 10, m is 0 or an integer of 1 to 4, A is carboxyl group, sulfonic acid group or an alkali metal or ammonium salt thereof. As the commercially available anionic surfactant, there are, for example, DS-101 which is an aqueous ammonium solution of a perfluorooctanoic acid and available from DAIKIN INDUSTRIES, LTD., and the like.

Non-restricted example of the process for preparing the filler-containing PTFE granular powder of the present invention is, for instance, the process mentioned below.

A 11 kg mixture of a filler and a PTFE powder previously pulverized into a particle size of not more than 200 μm is pre-mixed with a 75-liter Henschel mixer.

The above-mentioned mixture of the PTFE powder and the filler is added in an amount of 2 kg into a 10-liter granulation tank containing 5.5 to 6 liters of ion-exchanged water.

Thereto are added 450 to 1,500 ml of an organic liquid forming a liquid-liquid interface with water and then 4 to 200 ml of a 5% aqueous solution of the above-mentioned surfactant. Subsequently the granulation is carried out for 5 to 10 minutes in the temperature range of 23° to 27° C. at a stirring speed of 600 to 900 rpm with a cone blade.

In addition to the above-mentioned timing for adding the surfactant, there are other timings, for example, prior to adding the mixture of the PTFE powder and the filler, prior to adding the organic liquid forming a liquid-liquid interface with water, etc. From the viewpoint of preferentially adsorbing the surfactant on the liquid-liquid interface (namely, interface between the organic liquid and water), it is preferable that the surfactant is added during a period of time after adding the organic liquid forming a liquid-liquid interface with water until the granulation is initiated.

Then the stirring is carried out for two minutes at a stirring speed of 1,000 to 2,000 rpm with dispersing blades of 100 mm diameter.

The granulation for shaping is then carried out for 0 to 15 minutes in the temperature range of 23° to 27° C. at a stirring speed of 600 to 800 rpm with cone blades.

After that, the inside temperature of the granulation tank is raised up to a temperature in the range of 37.5° to 38.0° C. over 15 to 30 minutes with stirring, and is kept at that temperature for 0 to 60 minutes. The temperature keeping step is not conducted from the viewpoint of separation of filler in case where the filler is, for example, glass fiber or a metal fiber or metal powder such as bronze powder, gold powder, silver powder, copper powder, stainless steel powder, stainless steel fiber, nickel powder or nickel fiber.

Then, the stirring is stopped, and the granulates are separated from water by using a 150 mesh sieve and dried in an electric oven at 120° to 250° C. for 15 to 20 hours to give the filler-containing PTFE granular powder of the present invention.

The present invention is also characterized in that the granulation is carried out by combining the stirring and deagglomeration of the powder.

Deagglomeration is carried out by means for partly deagglomerating a granulate which has a proper size and has already been formed as a secondary agglomeration of primary particles to decrease a secondary particle size, and for example, can be carried out by using a method of stirring with dispersing blades at high speed.

The stirring and deagglomerating may be carried out at the same time or separately.

By the combination of stirring and deagglomerating, an excellent effect of obtaining a granulate having a large apparent density and finely granulated can be exhibited.

A deagglomerating mechanism for powder particles means a mechanism being capable of partly deagglomerating a granulate which has a proper size and has already been formed as a secondary agglomeration of primary particles to decrease a secondary particle size.

Figure 1:
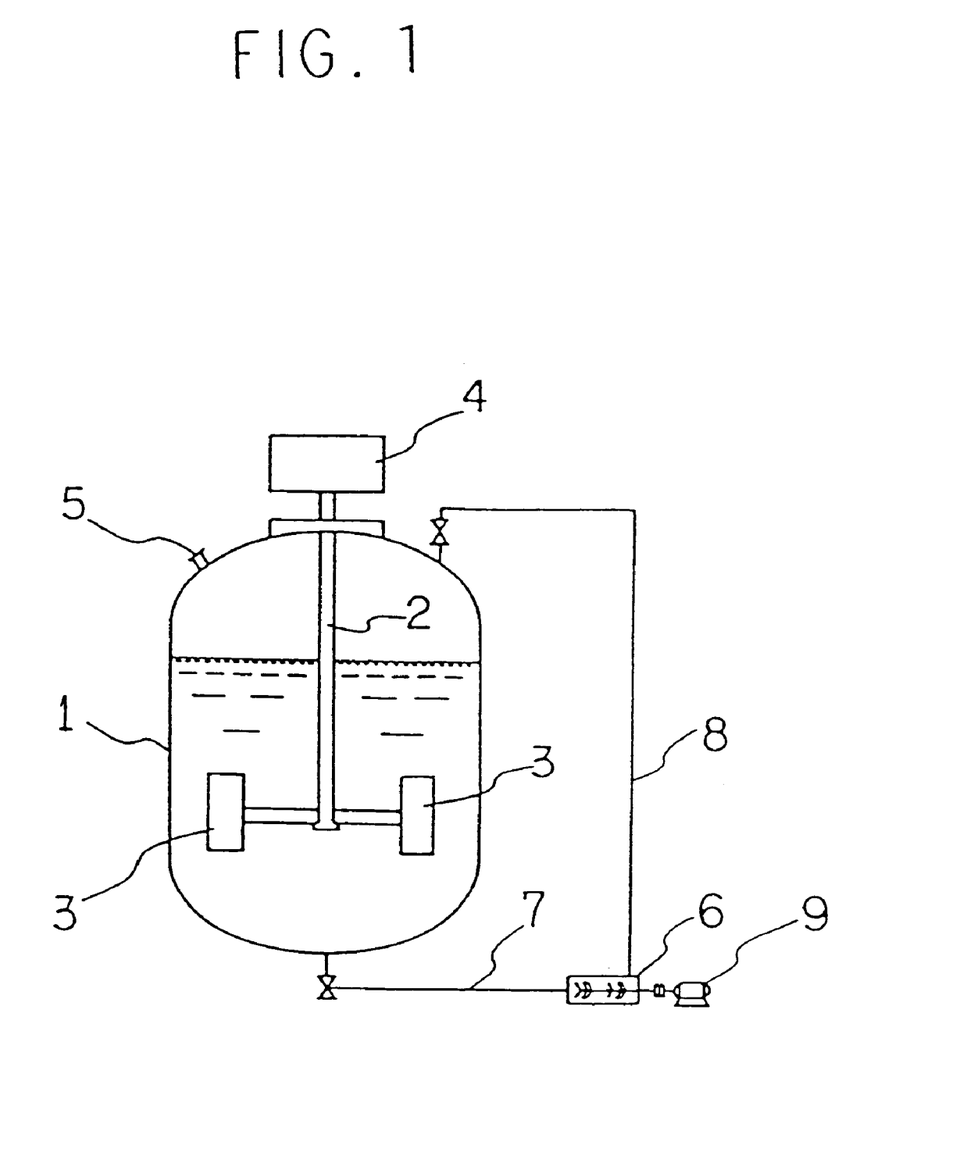
FIG. 1 is a diagrammatic cross-sectional view of a granulator usable in the preparation process of the present invention.
Figure 2:
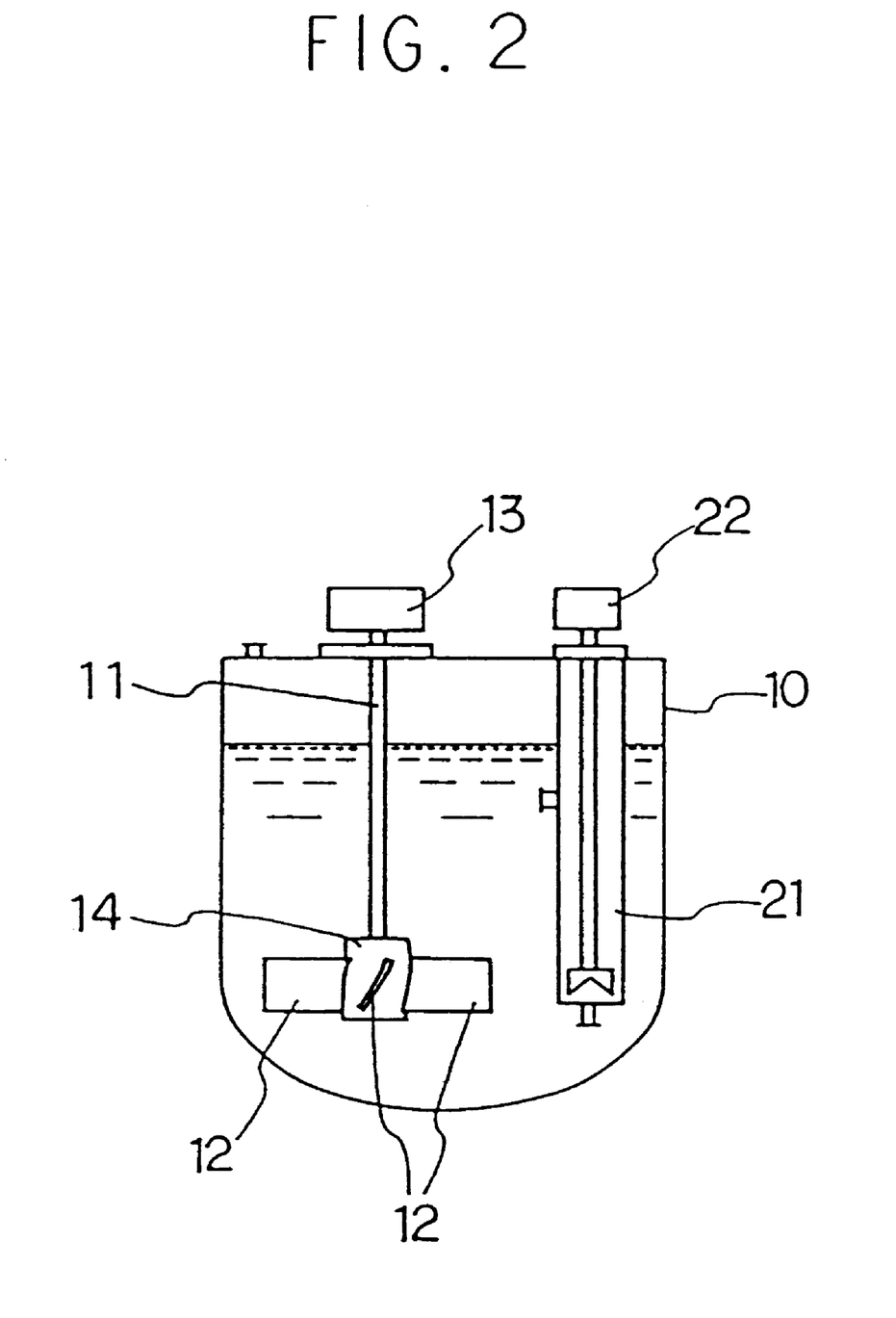
FIG. 2 is a diagrammatic cross-sectional view of another granulator usable in the preparation process of the present invention.

Equipment used for the preparation process of the present invention is then explained by means of figures. FIGS. 1 and 2 are diagrammatic cross-sectional views of equipment used for the preparation process of the present invention. In FIG. 1, numeral 1 represents a stirring tank, in which a rotation shaft 2 is disposed vertically at the center thereof, stirring blades 3 are disposed radially at the bottom portion of the rotation shaft and the top portion of the shaft is connected to a motor 4. Numeral 5 represents a liquid medium supply port. Numeral 6 represents a pulverizing machine and numeral 9 represents a motor. The deagglomerating machine 6 is connected to the bottom and top of the stirring tank 1 by means of transfer pipes 7 and 8, respectively. The deagglomerating machine 6 may be one which deagglomerates filler-containing PTFE powder particles contained in the liquid medium by rotating a cutter in the form of turbine blade inside the cylindrical machine while transferring the liquid medium. Examples of suitable deagglomerating machine are, for instance, a disintegrator (available from Komatsu Ltd.) and a Pipe Line Homomixer (available from Tokushu Kika Kogyo Kabushiki Kaisha) equipped with a stator and cutter for cutting and giving an impact. In order to carry out granulation by such equipment, a liquid medium containing a filler-containing PTFE powder is introduced into the stirring tank 1 through the liquid medium supply port 5, stirred with the stirring blades 3, taken out of the stirring tank 1 through the transfer pipe 7 at the bottom of the tank at the same time of the stirring or after the stirring, passed through the deagglomerating machine 6 to deagglomerate formed particles having a large particle size, and then returned to the stirring tank 1 through the transfer pipe 8.

Thus the stirring and granulating in the stirring tank 1 and the deagglomeration of particles having a large particle size in the deagglomerating machine 6 are carried out simultaneously, continuously or alternately to give granulates having a uniform particle size. Also in that case, similar granular powder can be obtained without operating the stirring mechanism by recirculating the liquid medium and deagglomerating particles with the deagglomerating machine 6 only. The reason thereof is assumed to be because the stirring effect can be achieved by recirculating the liquid medium with the deagglomerating machine.

FIG. 2 is a diagrammatic cross-sectional view of another equipment which can be used in the preparation process of the present invention. In a stirring tank 10 are provided a deagglomerating machine 21 (dispersing blades) and stirring blades 12 mounted on a rotation shaft 11. Numeral 13 represents a motor for the rotation shaft 11 and numeral 22 represents a motor for the deagglomerating machine 21. The stirring blades 12 are mounted radially and spirally on a boss 14 at the bottom of the rotation shaft 11. Therefore in that case, while the aqueous medium in the tank is stirred with the stirring blades 12 to granulate a filler-containing PTFE powder contained in the aqueous medium, the granulated particles are deagglomerated with the deagglomerating machine 21.

In the present invention, it is preferable to introduce the thus-prepared slurry of filler-containing PTFE powder into the stirring tank for granulation and carry out stirring for granulation and deagglomerating. The filler-containing PTFE powder previously wetted with a small amount of water may be mixed with the remaining liquid medium in the stirring tank. Also it is possible to adopt a method for stirring by previously introducing a liquid medium into the stirring tank and then feeding thereto the filler-containing PTFE powder.

The slurry of filler-containing PTFE powder is granulated by an effect of stirring. At the same time of the stirring or after the granulation, large particles, for example, those having a particle size of not less than 2,000 $\mu$m are deagglomerated with the deagglomerating machine and finally formed into a powder of particles having a uniform particle size of not more than 500 $\mu$m of an average particle size without containing coarse particles having a particle size exceeding 1,000 $\mu$m.

Such a preparation process of the present invention can give a filler-containing PTFE granular powder which has physical properties mentioned below and provides a molded product with physical properties described below. Particularly since the particle size distribution is narrow, complicated steps, for example, a step of taking out particles of a small size with a sieve like a conventional method and the like, are not necessary. Thus, the filler-containing PTFE granular powder which cannot be prepared by a conventional process can be prepared.

(Physical Properties of Filler-containing PTFE Granular Powder)

Filler content: 2.5 to 50%

When the filler content is less than 2.5%, abrasion resistance and creep resistance are lowered, and when more than 50%, there is a tendency that inherent slipping property of fluorine-containing resins is lowered and an article contacting the molded article obtained from the granular particles is damaged. Particularly 5 to 40% is preferable from the viewpoint of abrasion resistance, creep resistance and slipping property.

Apparent density: not less than 0.7 g/cm$^3$

When less than 0.7 g/cm$^3$, an amount of powder to be filled in a die is small.

Flowability (21B method): not less than 6 times

When not more than 5.5 times, flowability in a hopper is not so good. Particularly 8 times is preferable.

Angle of repose: not more than 40 degrees

The powder having an angle of repose exceeding 42 degrees is not preferable because its flowability is not good. Particularly an angle of repose of not more than 40 degrees is preferable.

The angle of repose is not more than 38 degrees when the apparent density is not less than 0.9 g/cm$^3$ and less than 1.0 g/cm$^3$, and is not more than 36 degrees when the apparent density is not less than 1.0 g/cm$^3$.

An angle of repose of a powder is affected by a gravity and becomes smaller as an apparent density becomes higher. Accordingly, the granular powder obtained by the granulation method of the present invention changes its angle of repose depending on its apparent density. The powders of the present invention have smaller angle of repose than that of granular powders obtained by conventional techniques.

The angle of repose of the powders obtained by the conventional techniques is not less than 40 degrees when the apparent density is not less than 0.6 g/cm$^3$ and less than 0.9 g/cm$^3$; not less than 38 degrees when the apparent density is not less than 0.9 g/cm$^3$ and less than 1.0 g/cm$^3$; and not less than 36 degrees when the apparent density is not less than 1.0 g/cm$^3$ Particle size distribution A:

Granular powder remaining on a 10 mesh sieve: 0%

Granular powder remaining on a 20 mesh sieve: not more than 5%

The granular powder having the particle size distribution mentioned above after the granulation is preferable since it is filled uniformly in the die because the particle size is uniform. It is particularly preferable that the granular powder remaining on the 10 mesh and 20 mesh sieves is 0%.

Particle size distribution B: not less than 50% by weight

The granular powder having the particle size distribution mentioned above after the granulation is preferable because it is filled uniformly in the die. Particularly not less than 60% by weight is preferable.

Average particle size: not more than 500 μm

When larger than 500 μm, the powder cannot be filled in the thin-walled die. Particularly preferable is from 150 to 400 μm from the viewpoint of filling the powder in the thin-walled die.

Electrostatic charge: not more than 50 V

A PTFE powder having an electrostatic charge exceeding 50 V adheres to not only a die but also a hopper and feeder due to static electricity at the time of molding, which results in lowering of flowability. A preferable amount is not more than 10 V. In such an amount, no lowering of flowability occurs at all. (Physical properties of molded article)

Tensile strength: not less than 100 kgf/cm$^2$

When less than 100 kgf/cm$^2$, the molded article is inferior in mechanical strength. Preferable tensile strength is not less than 150 kgf/cm$^2$ and the tensile strength is determined depending on its application.

Elongation: 100 to 400%

When less than 100%, there is a case where the molded article is cut when mounted on an equipment or processed. Preferable elongation is not less than 150%.

Surface roughness: not larger than 3.0 μm

The molded article having a surface roughness larger than 3.0 μm is not preferable because unevenness of the surface is larger than desired. Particularly preferable surface roughness is not larger than 2.0 μm.

Method for measuring each physical property is as follows.

Apparent density: Measured in accordance with JIS K 6891-5.3

Average Particle Size After Pulverization (Primary particle size)

Wet sieve method: JIS standard sieves of 20 mesh (sieve opening: 840 μm), 250 mesh (sieve opening: 62 μm), 270 mesh (sieve opening:. 53 μm), 325 mesh (sieve opening: 44 μm) and 400 mesh (sieve opening: 37 μm) are used. First, the 20 mesh sieve is placed on the 250 mesh sieve, and 5 g of a sample powder is put on the 20 mesh sieve. By spraying carbon tetrachloride carefully with a sprayer at a rate of about 3 liters/m$^2$ for about 30 seconds, the powder is rinsed on the lower sieve. When the sample powder has been rinsed completely, the upper sieve is removed and spraying all over the lower sieve is conducted for about four minutes. After that, the lower sieve is air-dried and a weight of the dried powder remaining thereon is measured. A series of the above-mentioned steps are repeated by using the 20 mesh sieve and each of the other three sieves of smaller meshes, respectively, and 5 g each of new sample powder is used. In order to obtain an accumulated weight percentage, the weights of the powder remaining on each sieve are multiplied by 20 and then those obtained values are plotted on a logarithmic probability paper to openings of each sieve. Those plotted points are connected with a line, particle sizes corresponding to the accumulated weight percentages 50($d_{50}$) and 84($d_{34}$) are read, and wet sieve size ($d_{WS}$) is calculated by the following equation.

$$\log_e d_{ws} = \log_e d_{50} - \frac{1}{2}\left(\log_e \frac{d_{34}}{d_{50}}\right)^2$$

Flowability (called 21B method): Measured in accordance with the method described in JP-A-3-259925.

Figure 3:
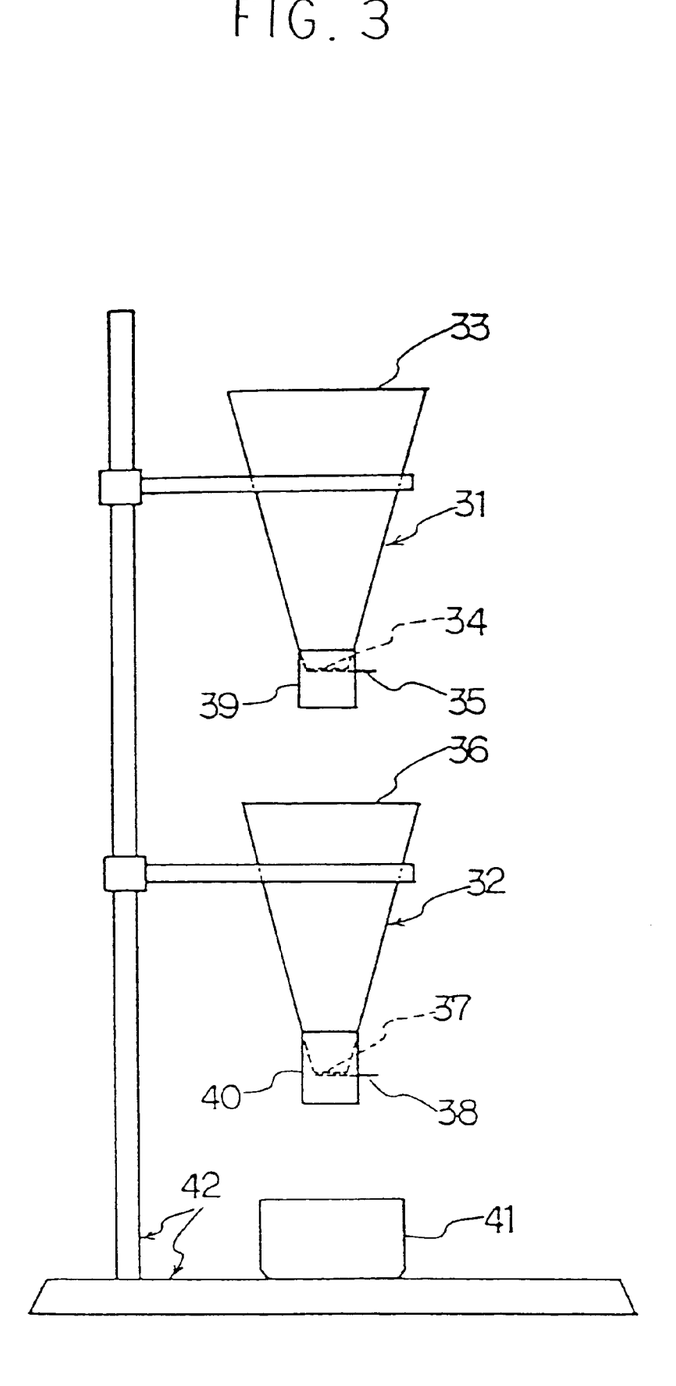
FIG. 3 is a diagrammatic view of an apparatus used for determining flowability of the granular powder in the present invention.

Namely, there is used a measuring device comprising a support base 42, an upper hopper 31 and a lower hopper 32. The both hoppers are aligned on their center lines and supported on the support base 42 as shown in FIG. 3 (corresponding to FIG. 3 described in JP-A-3-259925). The upper hopper 31 has an inlet 33 of 74 mm diameter, an outlet 34 of 12 mm diameter and a partition plate 35. The height from the inlet 33 to the outlet 34 is 123 mm. The partition plate 35 is provided on the outlet 34, and thereby the powder in the hopper can be kept therein and dropped optionally. The lower hopper 32 has an inlet 36 of 76 mm diameter, an outlet 37 of 12 mm diameter and a partition plate 38. The height from the inlet 36 to the outlet 37 is 120 mm, and the partition plate 38 is provided on the outlet 37 like the upper hopper. The upper hopper and the lower hopper are adjusted so that the distance between the both partition plates is 15 cm. In FIG. 3, numerals 39 and 40 represent outlet covers of each hopper, and numeral 41 represents a vessel for receiving the dropped powder.

Prior to measuring the flowability, about 200 g of powder is allowed to stand for not less than four hours in a room, the temperature of which is adjusted to 23.5° to 24.5° C., and then sieved with a 10 mesh sieve (sieve opening: 1,680 μm). The measurement of the flowability is carried out at the same temperature.

(I) At first, immediately after the upper hopper 31 is charged with just a cup of powder by using a 30 cc cup, the partition plate 35 is pulled out to drop the powder into the lower hopper. When the powder does not drop, the powder is stuck with a wire. After the powder has dropped completely into the lower hopper 32, the dropped powder is allowed to stand for 15±2 seconds, and then the partition plate 38 of the lower hopper is pulled out to see whether or not the powder is dropped from the outlet 37. When the powder is dropped completely within eight seconds, the powder is estimated to have been dropped as required.

(II) The same steps as above are repeated three times to see if the powder is dropped as required. In case where the powder is dropped satisfactorily twice or more, the flowability of the powder is estimated to be "Good". In case where the powder is never dropped, the flowability of the powder is estimated to be "Not good". In case where in three series of the dropping test, the powder has been dropped only one time, the dropping test is further conducted twice, and when the two series of the dropping test are both satisfactory, the flowability is estimated to be "Good". In other cases, the flowability is estimated to be "Not good".

(III) With respect to the powder estimated to be "Good", the upper hopper is charged with two cups of powder by using the same 30 cc cup, and the dropping test of the powder is conducted in the same manner as above. When as a result, the flowability is estimated to be "Good", the number of cups filled with the powder is increased successively and the dropping test is continued until the flowability is estimated to be "Not good". The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good"is subtracted by 1, and the obtained value is taken as "Flowability" of the powder.

Average Particle Size and Particle Size Distribution A of Granular Powder:

Standard sieves of 10, 20, 32, 48, 60 and 83 meshes (inch mesh) are placed in that order from the top, and PTFE granular powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size. Also percents by weight of the granular powder remaining on each sieve of 10, 20, 32, 48, 60 and 83 meshes are regarded as the particle size distribution A.

Particle size distribution B:

The particle size distribution B is a proportion in weight of the particles having a diameter 0.7 to 1.3 times the average particle size on the basis of the whole particles, and is calculated by multiplying the average particle size by 0.7 or 1.3. The obtained values are plotted on the accumulated weight percentage curve, and thus the weight percentage is obtained.

Tensile Strength (hereinafter may be referred to as "TS") and Elongation (hereinafter may be referred to as "EL")

A die having an inner diameter of 100 mm is charged with 25 g of powder, and a pressure is applied gradually over about 30 seconds until the final pressure becomes about 500 kg/cm$^2$. Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-58 by stretching at a stretching rate of 200 mm/min with an autograph having a gross weight of 500 kg.

Angle of repose:

Measured with Powder Tester available from Hosokawa Micron Co., Ltd.

Electrostatic charge:

Handy Electrostatic Meter SFM775 available from Ion Systems, Inc. is used to determine an electrostatic charge.

Surface roughness:

A 50 mm diameter die mold is charged with 210 g of powders and maintained for five minutes at a molding pressure of 500 kg/cm$^2$. The obtained pre-molded article is heated up from room temperature to 365° C. at a temperature raising rate of 50° C./hr. After maintained at 365° C. for 5.5 hours, the pre-molded article is cooled at a cooling rate of 50° C./hr. Roughness of the top surface of the obtained molded article is measured according to the center line average roughness (Ra) method described in JIS B 0601 by using a surface roughness measuring device available from Tokyo Seimitsu Kiki Kabushiki Kaisha.

Z value (whiteness):

A 50 mm diameter die was filled with 200 g of a granular powder which was then maintained at a molding pressure of 500 kg/cm$^2$ for five minutes. The obtained pre-molded article (diameter: about 50 mm, thickness: 50 mm) was heated up from room temperature to 365° C. at a temperature raising rate of 50° C./hr. After having been maintained at 365° C. for 5.5 hours, the pre-molded article was cooled at a cooling rate of 50° C./hr and then the molded article was cut crosswise with a lathe at the point about 25 mm from its end (center portion). Then the Z value on the center of the cut portion was measured through Z value measuring method of the XYZ colorimetric system of Commission International de Leclairage.

The preferred proportion of each component for preparing the filler-containing PTFE granular powder of the present invention is, for example, as follows:

| | |
|---|---|
| PTFE powder | 100 parts |
| Filler | 2.5 to 100 parts |
| Surfactant (on the basis of the total weight of PTFE powder and filler) | 0.01 to 5% by weight |
| Liquid-liquid interface-forming organic liquid | 30 to 80 parts |

The filler-containing PTFE granular powder prepared from those components in the proportion mentioned above is advantageous from the viewpoint of a large apparent density, a small angle of repose and good flowability. More preferable are the components mentioned below.

| | |
|---|---|
| PTFE powder | 100 parts |
| Filler | 5 to 80 parts |
| Surfactant (on the basis of the total weight of PTFE powder and filler) | 0.1 to 0.3% by weight |
| Liquid-liquid interface-forming organic liquid | 40 to 60 parts |

The filler-containing PTFE granular powder prepared from those components in the proportion mentioned above is excellent from the viewpoint of a small average particle size and a narrow particle size distribution, and from a point that a surface roughness of a molded article obtained from the granular powder is small.

The present invention is then explained by means of Examples, but is not limited thereto.

EXAMPLE 1

By using a 75-liter Henschel mixer, 9.35 kg (dry basis) of a PTFE powder (POLYFLON M-111 available from DAIKIN INDUSTIRES, LTD., modified PTFE, in which 0.1% by mole of perfluoro(propyl vinyl ether) was copolymerized) having an average particle size of 25 μm after the pulverization and 1.65 kg of glass fibers (average diameter: 12 μm, average fiber length: 80 μm) which had been subjected to water-repellent-treatment previously with an aminosilane coupling agent were pre-mixed.

A 10-liter granulation tank was charged with six liters of ion-exchanged water and 2 kg of the mixture of PTFE powder and glass fiber which was obtained by the above-mentioned pre-mixing.

Subsequently 40 ml of an aqueous ammonium solution of a perfluorooctanoic acid (DS-101, 5% by weight) having a concentration shown in Table 1 (concentration based on the total weight of PTFE powder and filler) was added, and further 1,200 ml of a liquid-liquid interface-forming organic liquid (methylene chloride) was added, followed by granulation for 5 minutes at 25° C.±2° C. under stirring at 800 rpm by using cone blades.

Further the stirring was continued at 2,000 rpm for two minutes by using 100 mm diameter dispersing blades.

Then the granulation was further carried out, for shaping of the granular powder, for 10 minutes at 25° C.±2° C. under stirring at 800 rpm by using cone blades.

Subsequently, the stirring was stopped when the temperature in the tank was raised up to 38° C. over 20 minutes. The granulates obtained by using a 150 mesh sieve were dried in an electric oven at 165° C. for 16 hours to obtain a filler-containing PTFE granular powder of the present invention, and the physical properties thereof were determined.

The results are shown in Table 1.

EXAMPLES 2 to 5

The same procedures as in Example 1 were repeated except that the amount of the anionic surfactant was changed to those shown in Table 1, and thus the filler-containing PTFE granular powder of the present invention was obtained. The tests were carried out in the same manner as in Example 1. The results are shown in Table 1.

With respect to the filler-containing PTFE granular powder obtained in Example 2, the photographs of the particles in the powder were taken in the following way.

Shape of particle: By using a Video Microscope of optical microscope available from Sony Corporation, photographs were taken at 100 magnifications and 200 magnifications.

Figure 4:
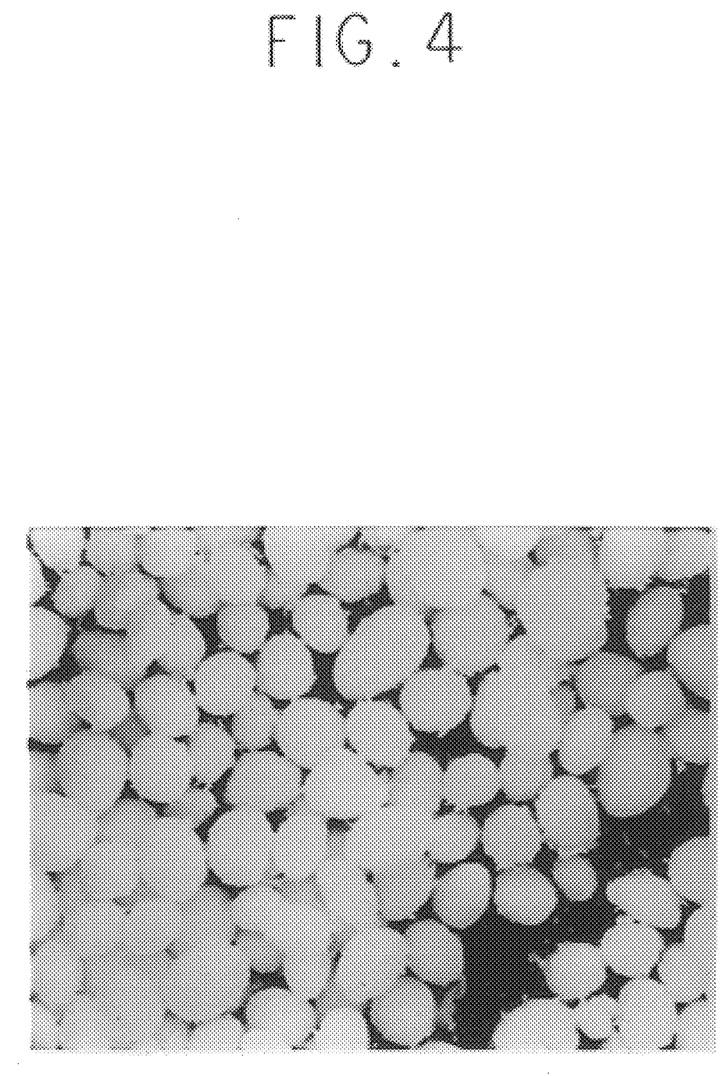
FIG. 4 is an optical microscopic photograph (magnification: ×200) showing a structure of particles in the filler-containing PTFE granular powder of the present invention, which was obtained in Example 2.
Figure 5:
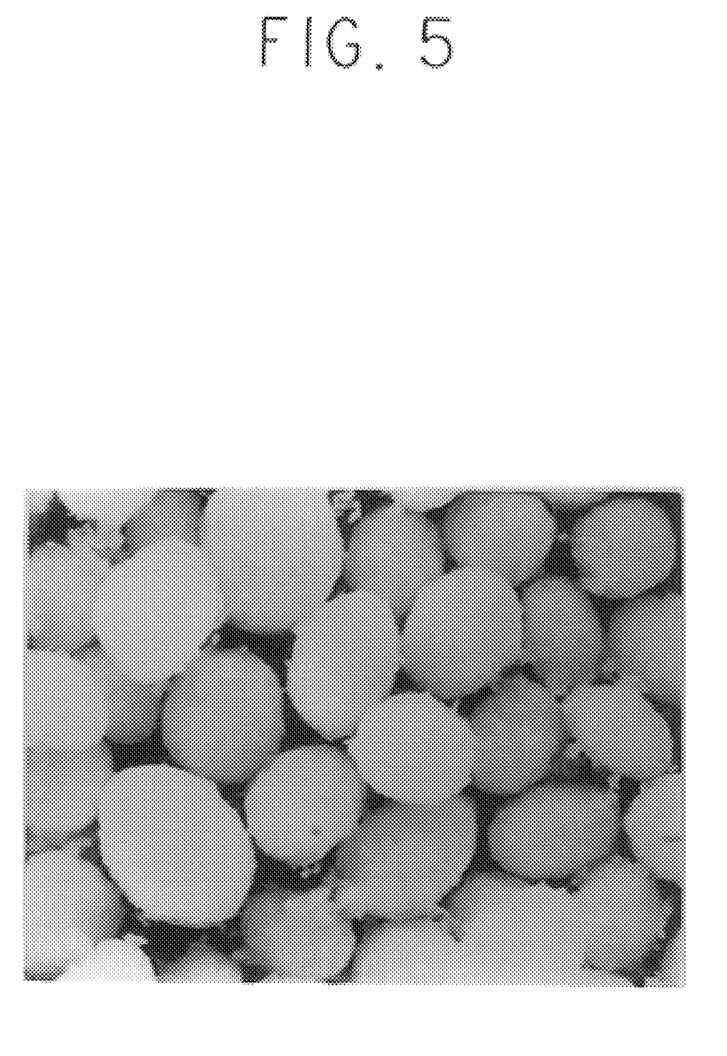
FIG. 5 is an optical microscopic photograph (magnification: ×100) showing a structure of particles in the filler-containing PTFE granular powder of the present invention, which was obtained in Example 2.

The results are shown in FIGS. 4 and 5.

EXAMPLES 6 to 8

The same procedures as in Example 1 were repeated except that the surfactant was changed to a specific nonionic surfactant, i.e., an ethylene oxide block copolymer (molecular weight of polyoxypropylene segment: 1,000, molecular weight of polyoxyethylene segment: 667, Puronon #104 available from Nippon Yushi Kabushiki Kaisha) of propylene glycol and was used in the amounts shown in Table 1, and thus the filler-containing PTFE granular powder of the present invention was obtained. The tests were carried out in the same manner as in Example 1. With respect to Example 6, a photograph (×200) was taken in the same manner as in Example 2. The results are shown in Table 1 and FIG. 6.

EXAMPLE 9

The same procedures as in Example 1 were repeated except that as the surfactant, 4 ml of DS-101 (anionic surfactant) was used in combination with 40 ml of a 5% by weight of aqueous dispersion of Puronon #104 (nonionic surfactant), and thus the filler-containing PTFE granular powder of the present invention was obtained. The tests were carried out in the same manner as in Example 1. The results are shown in Table 1.

EXAMPLES 10 and 11

The same procedures as in Example 1 were repeated except that the stirring (deagglomeration) at 2,000 rpm by using a 100 mm diameter dispersing blade was not carried out and the amount of the surfactant was changed to those shown in Table 1, and thus the filler-containing PTFE granular powder of the present invention was obtained. The tests were carried out in the same manner as in Example 1. The results are shown in Table 1.

COMPARATIVE EXAMPLES 1 and 2

The same procedures as in Example 1 were repeated except that the deagglomeration (stirring by using dispersing blades) was not carried out, the surfactant was not added, and the amount of the organic liquid was changed to those shown in Table 1, and thus the filler-containing PTFE granular powder for comparison was obtained. The tests were carried out in the same manner as in Example 1. Also photographs were taken in the same manner as in Example 2. The results are shown in Table 1, FIG. 7 (Comparative Example 1: ×100) and FIG. 8 (Comparative Example 2: ×200).

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Com. Ex. 1 | Com. Ex. 2 |
|---|---|---|---|---|---|---|---|---|---|---|---|---|---|
| Conditions of preparation | | | | | | | | | | | | | |
| Surfactant (kind) | DS-101 | DS-101 | DS-101 | DS-101 | DS-101 | Puronon #104 | Puronon #104 | Puronon #104 | Puronon #104 DS-101 | DS-101 | DS-101 | — | — |
| Surfactant (% by weight) | 0.01 | 0.05 | 0.1 | 0.2 | 0.3 | 0.01 | 0.1 | 0.3 | 0.1 + 10.01 | 0.3 | 0.5 | — | — |
| Liquid-liquid interface-forming organic liquid (kg) | 1.05 | 1.05 | 1.05 | 1.05 | 1.05 | 1.05 | 1.05 | 1.05 | 1.0 | 1.1 | 1.1 | 1.2 | 1.0 |
| Physical properties of granular powder | | | | | | | | | | | | | |
| Apparent density (g/cm$^3$) | 0.84 | 0.84 | 0.84 | 0.80 | 0.75 | 0.88 | 0.86 | 0.86 | 0.87 | 0.63 | 0.66 | 0.62 | 0.58 |
| Flowability (21B method) | 6 | 8 | 8 | 8 | 8 | 8 | 8 | 8 | 8 | 5.5 | 8.0 | 8 | 4 |
| Angle of repose (degree) | 38.2 | 38.1 | 36.8 | 38.3 | 39.2 | 36.2 | 36.2 | 36.3 | 36.0 | 42.1 | 41.2 | 40.8 | 42.1 |
| Electrostatic charge (V) | 9 | 8 | 5 | 3 | 3 | 2 | 0 | 0 | 0 | 2 | 1 | 320 | 400 |
| Particle size distribution A (% by weight) | | | | | | | | | | | | | |
| 10 on | 0.0 | 0.0 | 0.0 | 0.0 | 0.0 | 0.0 | 0.0 | 0.0 | 0.0 | 0.0 | 0.0 | 16.8 | 0.0 |
| 20 on | 0.0 | 0.2 | 0.0 | 0.0 | 0.0 | 0.0 | 0.0 | 0.0 | 0.0 | 10.0 | 16.6 | 20.4 | 30.1 |
| 32 on | 42.3 | 11.6 | 12.9 | 11.4 | 0.4 | 29.6 | 5.2 | 2.0 | 0.1 | 61.9 | 50.1 | 43.5 | 35.6 |
| 48 on | 54.9 | 59.0 | 49.0 | 47.3 | 45.6 | 53.1 | 47.4 | 14.7 | 20.1 | 27.4 | 23.2 | 18.6 | 26.3 |
| 60 on | 2.0 | 20.8 | 27.7 | 32.7 | 33.5 | 14.8 | 42.1 | 34.3 | 20.5 | 0.6 | 6.1 | 0.6 | 5.5 |
| 83 on | 2.0 | 8.4 | 10.1 | 8.6 | 13.4 | 2.4 | 5.3 | 44.1 | 40.8 | 0.0 | 4.0 | 0.2 | 2.4 |
| 83 pass | 0.0 | 0.0 | 0.3 | 0.0 | 7.1 | 0.0 | 0.0 | 4.9 | 18.5 | 0.0 | 0.0 | 0.0 | 0.0 |
| Particle size distribution B (% by weight) | 59.4 | 70.2 | 85.7 | 86.6 | 80.3 | 57.8 | 68.8 | 80.6 | 63.4 | 84.8 | 51.9 | 44.2 | 41.7 |
| Average particle size after granulation ($\mu$m) | 470 | 370 | 350 | 330 | 290 | 420 | 300 | 250 | 230 | 620 | 610 | 740 | 650 |
| Physical properties of molded article | | | | | | | | | | | | | |
| TS (kg/cm$^2$G) | 210 | 210 | 220 | 220 | 240 | 220 | 240 | 250 | 250 | 200 | 200 | 180 | 190 |
| EL (%) | 280 | 280 | 290 | 290 | 300 | 290 | 300 | 310 | 310 | 270 | 270 | 260 | 260 |
| Surface roughness ($\mu$m) | 2.8 | 2.7 | 2.6 | 2.6 | 2.5 | 2.8 | 2.6 | 2.5 | 2.5 | 3.3 | 3.3 | 3.5 | 3.3 |
| Whiteness (Z value) | 95 | 94 | 93 | 85 | 80 | 96 | 95 | 95 | 95 | 80 | 69 | 75 | 78 |

In the column of the particle size distribution A of Table 1, 10 on, 20 on, 32 on, 48 on, 60 on and 83 on indicate the percentages of particles remaining on the 10 mesh, 20 mesh, 32 mesh, 48 mesh, 60 mesh and 83 mesh sieves, respectively. And, 83 pass represents the percentage of the particles passed through the 83 mesh sieve.

As is evident from the results in Table 1, the filler-containing PTFE granular powder obtained by the preparation process of the present invention has a large apparent density, particularly a small particle size, a narrow particle size distribution, a small electrostatic charge and a superior flowability in spite of the small particle size. Also, the molded article obtained from the granular powder is superior in tensile strength and elongation and the surface roughness thereof is small.

Also, it is recognized that the preparation process of the present invention can control the average particle size and the particle size distribution of the filler-containing PTFE granular powder by an addition amount of the specific surfactant.

Also when a white or transparent filler is used, the whiteness (Z value) of the obtained molded article is not less than 80, and particularly when a specific nonionic surfactant is used, the whiteness is not less than 95. Thus the whiteness is higher than that of conventional one.

Figure 6:
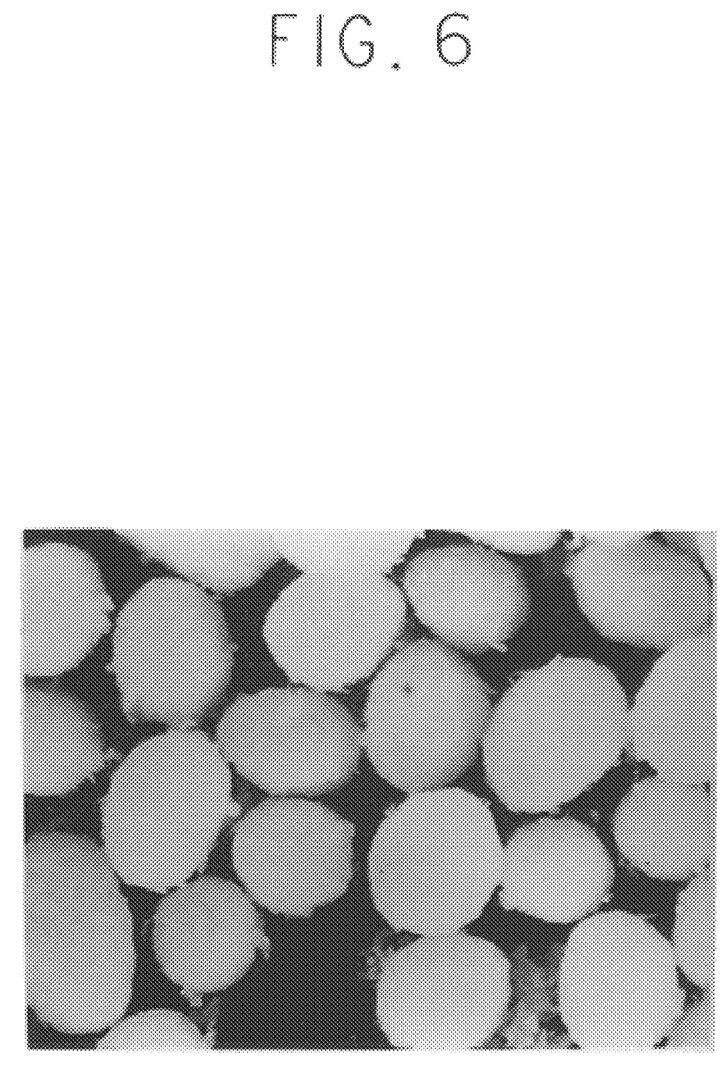
FIG. 6 is an optical microscopic photograph (magnification: ×200) showing a structure of particles in the filler-containing PTFE granular powder of the present invention, which was obtained in Example 6.
Figure 7:
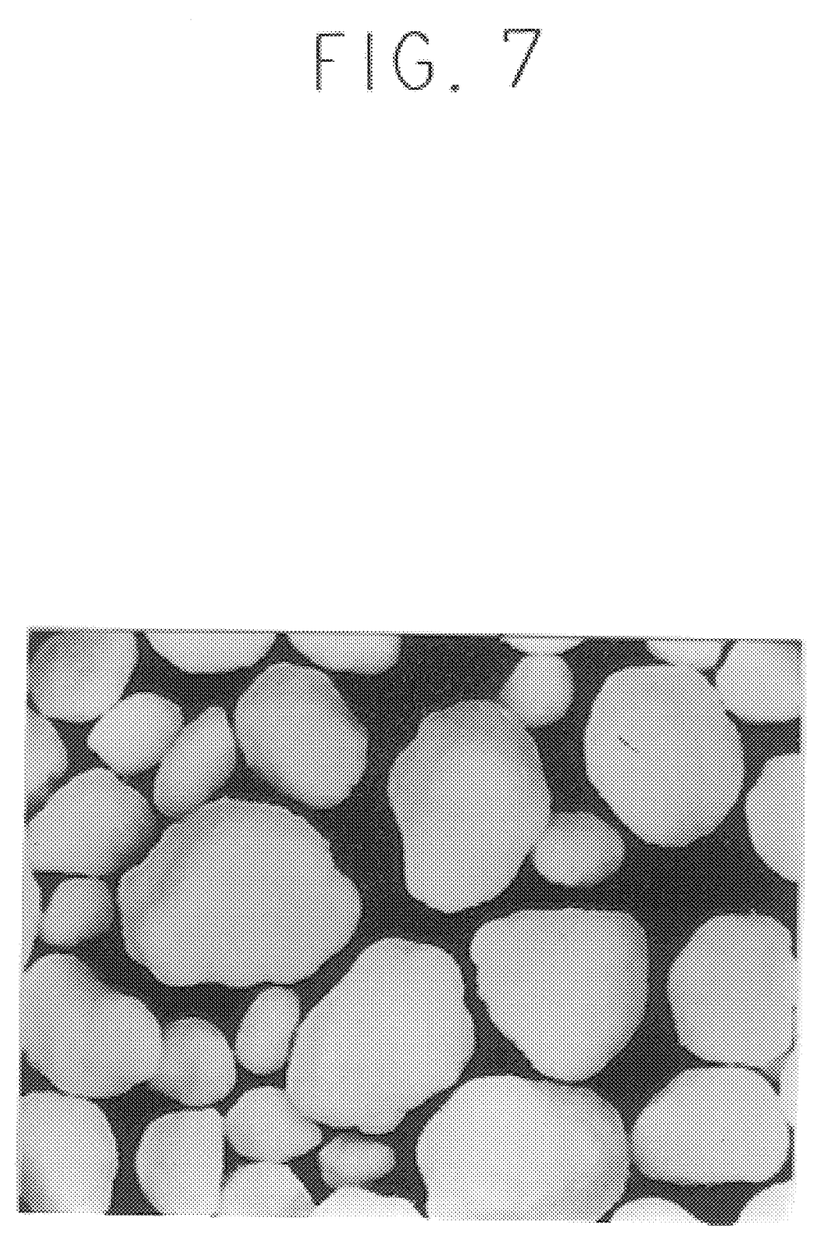
FIG. 7 is an optical microscopic photograph (magnification: ×100) showing a structure of particles in the filler-containing PTFE granular powder which was obtained in Comparative Example 1.
Figure 8:
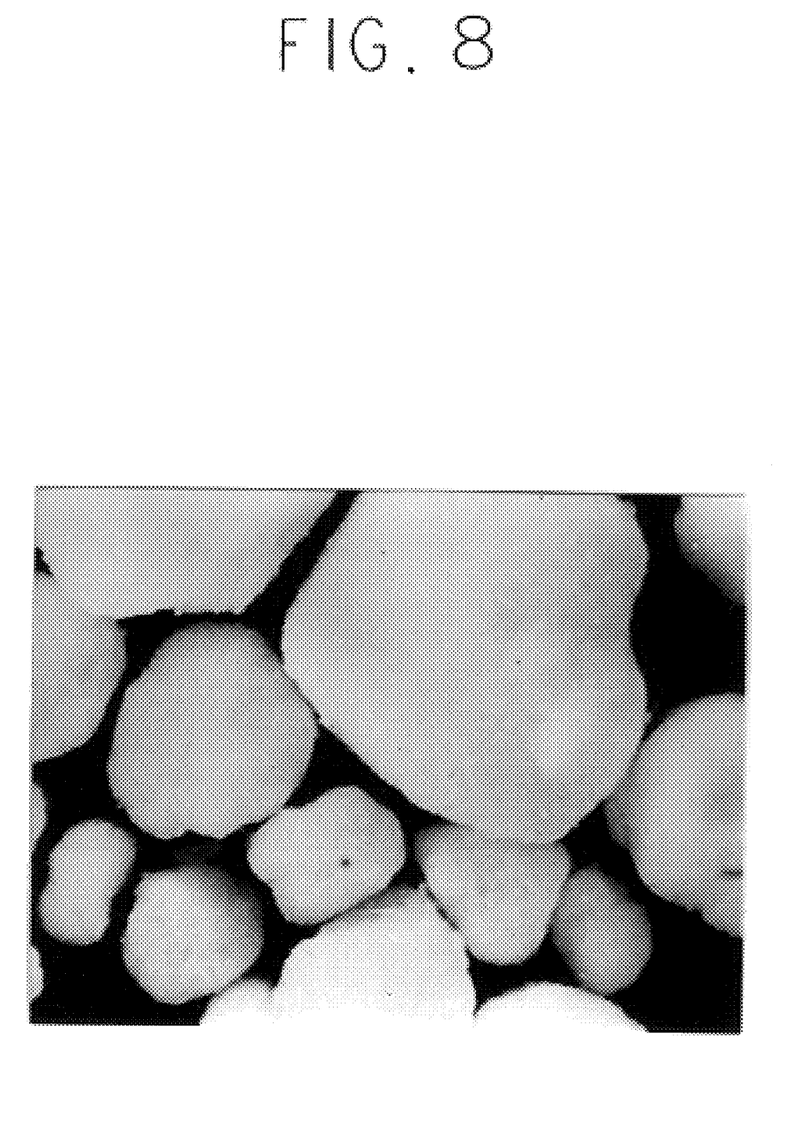
FIG. 8 is an optical microscopic photograph (magnification: ×200) showing a structure of particles in the filler-containing PTFE granular powder which was obtained in Comparative Example 2.

FIGS. 4 and 5 are optical microscopic photographs of Example 2 and FIG. 6 is an optical microscopic photograph of Example 6, which show the structure of the particle in the filler-containing PTFE granular powders of the present invention. FIGS. 7 and 8 are optical microscopic photographs which show the structure of the particle in the filler-containing PTFE granular powders obtained in Comparative Examples 1 and 2 without using a surfactant.

As is evident from these figures (photographs), though the particles in the filler-containing PTFE granular powder of the present invention are almost spherical, the particles in the filler-containing PTFE granular powder obtained according to the granulation process in Comparative Examples are not spherical. Further the particles in the filler-containing PTFE granular powder of the present invention are obviously smaller than the particles in the filler-containing PTFE granular powder obtained in Comparative Examples.

The reason why the filler-containing PTFE granular powder of the present invention is remarkably superior in powder flowability in spite of the small average particle size seems that, for example, the shape of the particles are almost spherical as mentioned above.

INDUSTRIAL APPLICABILITY

The filler-containing PTFE granular powder of the present invention which contains the almost spherical particles in its major portion has a large apparent density, a small average particle size, a narrow particle size distribution and a small electrostatic charge and is superior in powder flowability in spite of the small particle size. And, the molded product obtained from the granular powder is superior in tensile strength and elongation and has a small surface roughness and high whiteness.

Also, the preparation process of the present invention not only can provide the filler-containing PTFE granular powder having superior physical properties as mentioned above but also can control the average particle size and particle size distribution by the amount of the surfactant, and can give the granular powder having a narrow particle size distribution.

What is claimed is:

1. A process for preparing a filler-containing polytetrafluoroethylene granular powder by granulation of a mixture of a polytetrafluoroethylene powder and a filler in water with stirring; characterized in that the granulation is carried out by stirring the mixture in water in the presence of an organic liquid which forms liquid-liquid interface with water and a nonionic surfactant having a hydrophobic segment comprising a poly(oxyalkylene) unit having 3 or 4 carbon atoms and a hydrophilic segment comprising a poly(oxyethylene) unit or in the coexistence of said organic liquid, said nonionic surfactant and an anionic surfactant.

2. The preparation process of claim 1, wherein the anionic surfactant is a fluorine-containing surfactant containing a perfluoroalkyl group or perchlorofluoroalkyl group as a hydrophobic group.

3. The preparation process of claim 1, wherein the filler is a white or transparent filler.

4. The preparation process of claim 1, wherein an amount of the surfactant is from 0.01 to 10% by weight on the basis of the polytetrafluoroethylene powder.

5. The preparation process of any of claim 1, wherein the polytetrafluoroethylene is tetrafluoroethylene homopolymer or a modified polytetrafluoroethylene obtained by copolymerizing 99 to 99.999% by mole of tetrafluoroethylene with 1 to 0.001% by mole of perfluoro(vinyl ether).

6. The preparation process of claim 1 by granulating a mixture of a polytetrafluoroethylene powder and a filler in water with stirring in the presence of said organic liquid and surfactant; characterized in that the granulation is carried out by stirring and deagglomerating together by using means for stirring and means for deagglomerating said mixture and a granular powder obtained by the granulation.

7. A filler-containing polytetrafluoroethylene granular powder obtained by granulation of a mixture of a pulverized polytetrafluoroethylene powder prepared by suspension polymerization and a filler which have been previously mixed in the dry state, said granulation being conducted in water with stirring in water in the presence of an organic liquid which forms liquid-liquid interface with water and an anionic surfactant and/or a nonionic surfactant having a hydrophobic segment comprising a poly(oxyalkylene) unit having 3 or 4 carbon atoms and a hydrophilic segment having comprising a poly(oxyethylene) unit; characterized in that the granular powder has an apparent density of not less than 0.7 g/cnie, an electrostatic charge of not more than 50 V, an average particle size of not more than 500 $\mu$m and giving a molded article having a whiteness (Z value) of not less than 80.

8. The granular powder of claim 7, wherein flowability of the granular powder by 21B method is not less than 6 times.

9. The granular powder of claim 7, wherein an angle of repose of the granular powder is not more than 40 degrees.

10. The granular powder of claim 7, wherein an electrostatic charge of the granular powder is not more than 10 V.

11. The granular powder of claim 7 which gives a molded article having a surface roughness of not more than 3.0 $\mu$m.

12. The granular powder of claim 7 which gives a molded article having a whiteness (Z value) of not less than 80.

13. A filler-containing polytetrafluoroethylene granular powder in which the polytetrafluoroethylene is obtained from a pulverized polyterrafluoroethylene powder prepared by suspension polymerization, said granular powder has an apparent density of not less than 0.7 g/cm$^3$, and angle of repose of not more than 40 degrees, an average particle size of not more than 500 $\mu$m and as electrostatic charge of not more than 50 V, and giving a molded article having a whiteness (Z value) of not less than 80 and surface roughness of not more than 3.0 $\mu$m.

14. The filler-containing polytetrafluoroethylene granular powder of claim 7 which contains 2.5 to 50% by weight of the filler.

15. The filler-containing polytetrafluoroethylene granular powder of claim 7, wherein a particle size distribution of the granular powder is that the granular powder remaining on the 10 mesh sieve is 0% and the granular powder remaining on the 20 mesh sieve is not more than 5%.

16. The granular powder of claim 7, wherein a proportion of particles having a particle size 0.7 to 1.3 times the average particle size of particles in the granular powder is not less than 50% by weight on the basis of the whole particle.

17. A polytetrafluoroethylene granular powder of claim 13, wherein the electrostatic charge is not more than 10 V.

18. A polytetrafluoroethylene granular powder of claim 13, wherein a particle size distribution of the granular powder is that the granular powder remaining on the 10 mesh sieve is 0% and the granular powder remaining on the 20 mesh sieve is not more than 5%.

19. A polytetrafluoroethylene granular powder of claim 13, wherein a proportion of particles having a particle size 0.7 to 1.3 times the average particle size of particles in the granular powder is not less than 50% by weight on the basis of the whole particles.

* * * * *